J. W. THROPP.
BEARING FOR HEAVY ROLLS.
APPLICATION FILED MAR. 19, 1918.
1,304,220.
Patented May 20, 1919.
3 SHEETS—SHEET 1.
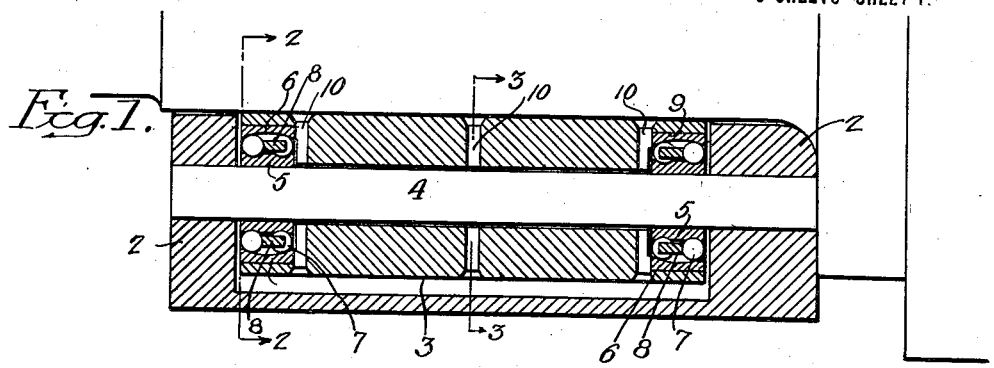
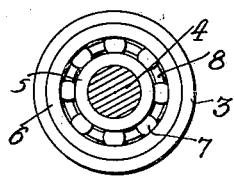
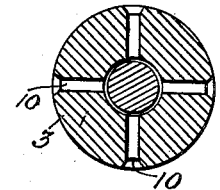
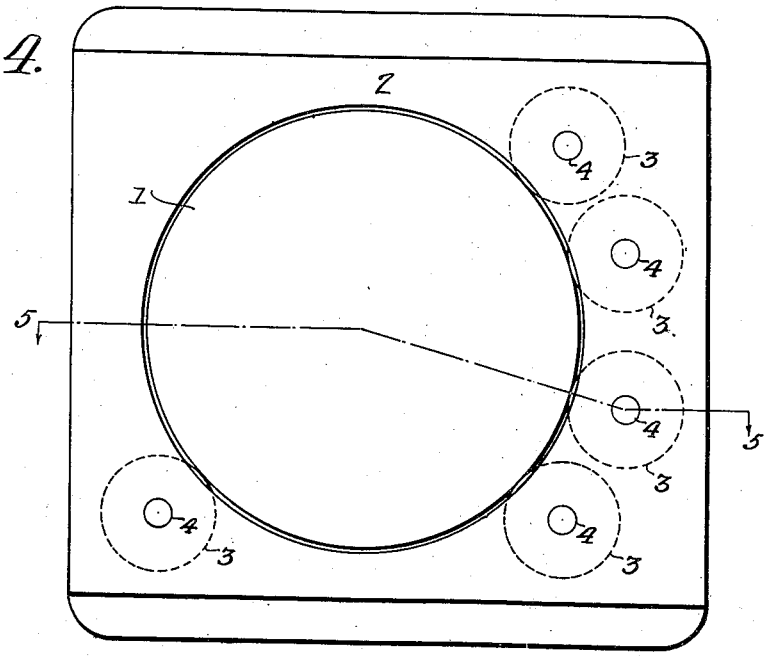
Inventor:
Joseph W. Thropp,
by his Attorneys,

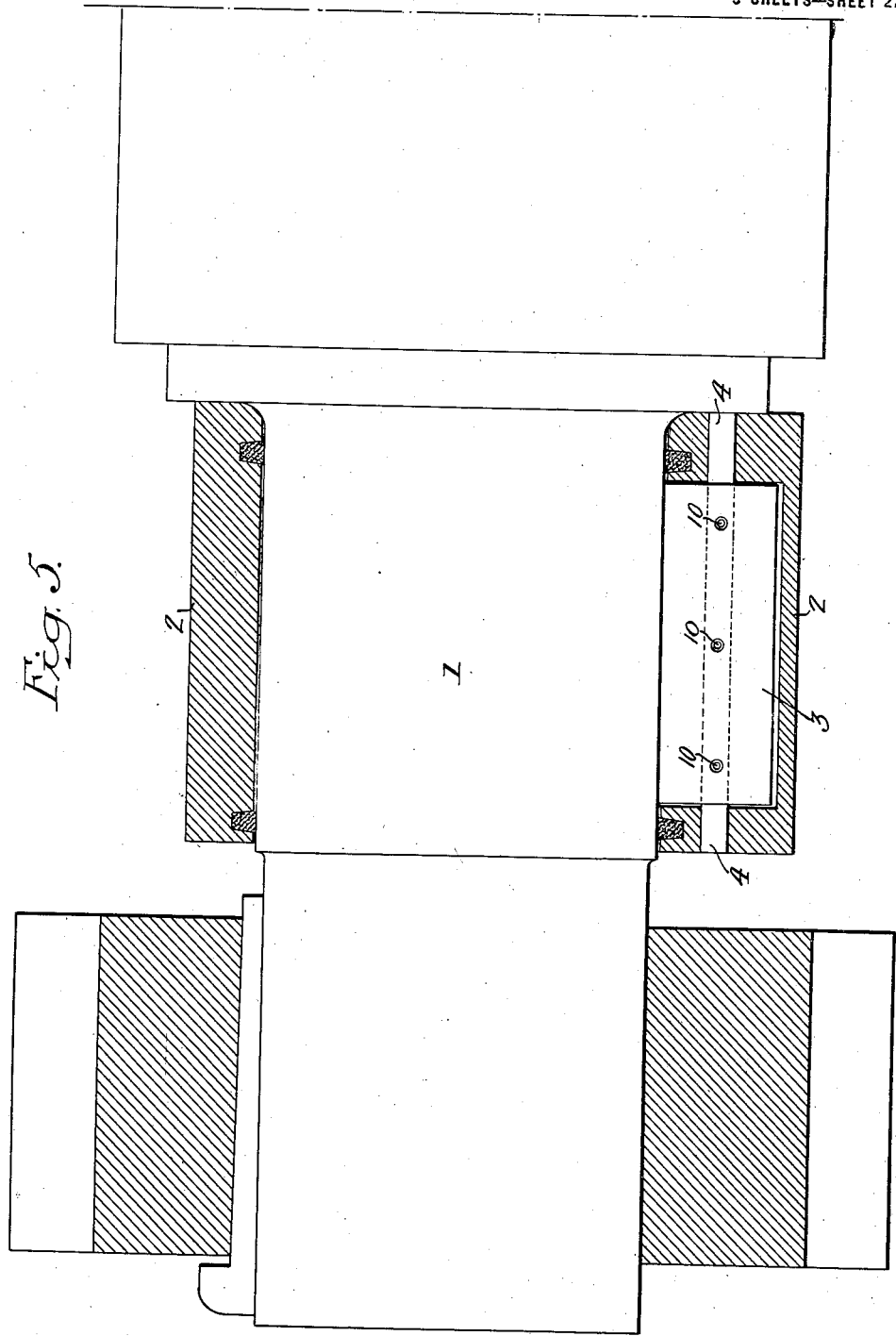

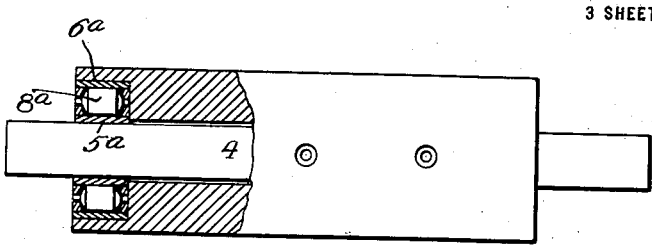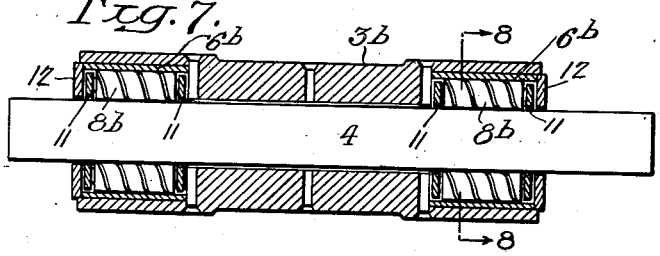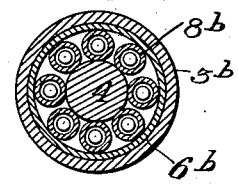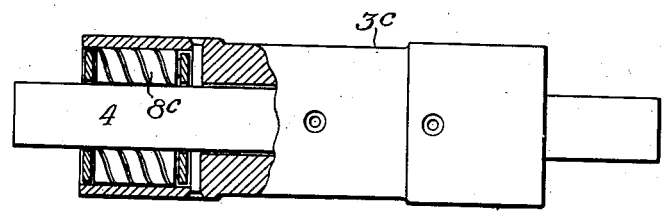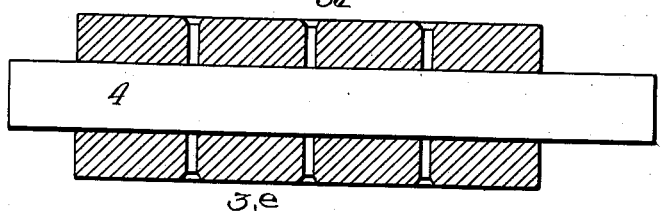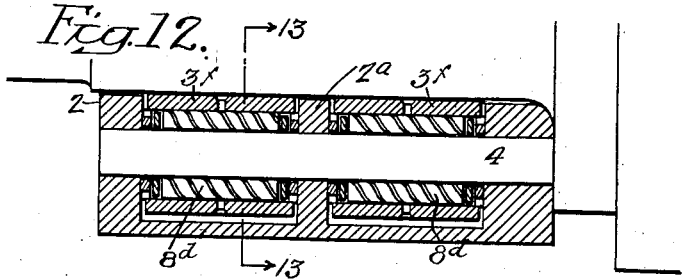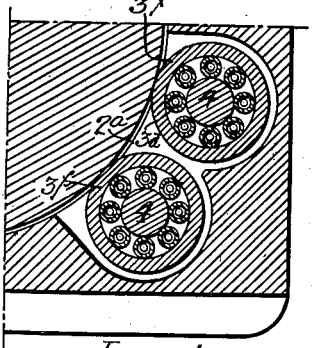

UNITED STATES PATENT OFFICE.

JOSEPH W. THROPP, OF TRENTON, NEW JERSEY.

BEARING FOR HEAVY ROLLS.

1,304,220.  Specification of Letters Patent.  Patented May 20, 1919.

Application filed March 19, 1918. Serial No. 223,379.

*To all whom it may concern:*

Be it known that I, JOSEPH W. THROPP, a citizen of the United States, and a resident of Trenton, county of Mercer, State of New Jersey, have invented certain Improvements in Bearings for Heavy Rolls, of which the following is a specification.

My invention relates particularly to the bearings used for carrying rolls which are subjected to extreme loads or pressures, such as rolls used in reducing rubber, or used in steel mills and other manufacturing establishments.

My present improvements relate to the rollers used in the anti-friction bearing forming the subject of the U. S. Patent, No. 1,263,964, granted April 23, 1918.

One object of my present invention is to provide means for properly supporting the rollers which form an anti-friction bearing and to provide these rollers with anti-friction devices so that they will travel freely on their spindles.

By my invention the bearings for the trunnions of these rolls will freely carry any load to which the rolls are subjected.

A further object of the invention is to mount the spindles rigidly in the casing of the bearings and to allow the rollers to rotate freely thereon.

In the accompanying drawings:

Figure 1 is a longitudinal sectional view showing one of the rollers mounted on a spindle carried by the fixed portion of the bearing;

Fig. 2 is a section on the line 2—2, Fig. 1;

Fig. 3 is a sectional view on the line 3—3, Fig. 1;

Fig. 4 is an end view of the anti-friction bearing set forth and claimed in the above entitled application showing the application of my improved bearing rollers;

Fig. 5 is a sectional view on the line 5—5, Fig. 4;

Fig. 6 is a view illustrating a modification in which rollers are used for supporting the main anti-friction rollers instead of the balls illustrated in Fig. 1;

Fig. 7 is a view illustrating the use of a roller for supporting the main anti-friction roller, using a hard metal shell within a comparatively soft metal roller;

Fig. 8 is a sectional view on the line 8—8, Fig. 7;

Fig. 9 is a view, partly in section, illustrating my invention used in connection with a hard steel roller, the small spiral roller being used between the spindle and the main roller and the small rollers bearing directly upon the surface of the hard steel roller.

Fig. 10 is a sectional view illustrating a roller mounted on a fixed spindle which extends entirely through the roller and is adapted to fixed bearings;

Fig. 11 is a sectional view showing a fixed spindle, the roller consisting of a series of independent sections;

Fig. 12 is a sectional view showing a roller made in two sections with an intermediate supporting bearing, the small anti-friction rollers extending substantially the full length of the main roller sections, and Fig. 13 is a sectional view on the line 13—13, Fig. 12.

Referring to Figs. 4 and 5 of the drawings, 1 is a cylindrical shaft, which is free to rotate in the bearings formed by a casing 2 and a series of anti-friction rollers 3 located in the present instance as shown in Fig. 4 so that three of the rollers support the weight of the shaft and the balance of the rollers, together with two of the first mentioned rollers are so located as to resist the lateral pressure of the shaft. This shaft 1 may form part of a pressure roll of a rolling machine which, when in action, will direct the pressure from the weight-carrying rollers to the pressure resisting rollers at one side. This type of bearing is fully set forth and claimed in the above entitled application.

My present invention relates particularly to the construction of the anti-friction rollers and their supports. These rollers must be substantial and capable of resisting heavy pressures. Each roller 3 is mounted so as to rotate freely on a spindle 4, which extends from one side of the casing 2 to the other and is mounted in the casing, being preferably secured therein so that it will not turn or move longitudinally. At each end of the roller, as illustrated in Figs. 1 and 3, are the self-adjusting anti-friction bearings for the roller consisting of a race 5 mounted on the shaft and a race 6 carried by the roller 3 and between the two are the balls 7, staggered and held apart by a separating ring 8. This is a common form of roller bearing. The bearings are located, as above remarked, at each end of the roller 3 and the roller is recessed, as at 9, to receive the bearings. In the rollers are passages 10 for a lubricant for properly lubricating the bearings.

By this construction, the spindle 4 carries the load and the small roller bearings at each end of the shaft support the main roller, which, in turn, resists the pressure of the main shaft 1. The spindles are of such a size that they will resist the pressure as it will be understood that this bearing is particularly adapted as a roller bearing for heavy machines, such as rolling machines for rolling rubber, steel, iron, paper, and like material, in which the shafts must turn freely and true.

In Fig. 6, I have illustrated a modification in which the rollers $8^a$ are adapted to the races $5^a$ and $6^a$, and in Fig. 7, I have shown the rollers tubular in form and made of sheet metal turned in spiral form, as shown at $8^b$. The rolls, in this instance, turn directly on the shaft and there is an annular race $6^b$ carried by the main roller $3^b$. At each end of the roller $6^b$ are bearing rings 11 and beyond the rings is an annular plate 12 which incloses the rollers in order to keep the dirt and other foreign material from gaining access to the race. In this instance, the race is made of hard steel and the roller $3^b$ is made of soft steel. In some instances, the roller may be made of hard steel as indicated at $3^c$, Fig. 9, in which instance both the inner and outer races are dispensed with and the small rollers $8^c$ travel in contact with the spindle and with the interior walls of the recess in the ends of the main rollers $3^c$. In some instances, where it is unnecessary to provide balls or rollers for the main anti-friction rollers, I may make them as illustrated in Fig. 10, in which the roller $3^d$ is mounted on a spindle 4, which extends throughout the length of the roller and is adapted to bearings in the casing, the roller, in this instance having a full bearing upon the spindle.

In Fig. 11, I have illustrated the same construction with the exception that the roller $3^e$ is made in sections, which rotate independently on the spindle, which extends entirely through the roller and is adapted to the casing.

In Fig. 12, I have illustrated another modification which is particularly adapted for very heavy work where a central bearing $2^a$ is provided for the spindle 4, which is also adapted to the casing 2, and on the spindle on each side of the center bearing are comparatively short rollers $3^f$. These rollers are mounted on a series of anti-friction rollers $8^d$ which extend, in the present instance, substantially the full length of the rollers $3^f$ and are made of sheet metal coiled in spiral form.

Thus it will be seen that in all of the constructions the spindles on which the rollers are mounted are firmly supported in the casing and are preferably secured therein so that they will not rotate or move longitudinally, and the carrying rollers for the heavy shaft are either mounted on the spindles or on anti-friction rollers, or balls, the rollers, or balls, in turn, being carried by the spindle. This makes an exceedingly substantial construction for the type of anti-friction bearing to which my invention is mainly applied, but it will be understood that the construction can be used with other types of bearings without departing from the essential features of the invention.

I claim:

1. The combination, in an anti-friction bearing, of a load shaft, a casing, an elongated anti-friction roller, a spindle extending through said roller; said spindle having its ends fixed in the casing and the latter with said roller being arranged to take the pressure of a load shaft, and self-alining roller bearings interposed between the spindle and the anti-friction roller and concealed by the latter.

2. The combination, in an anti-friction bearing, of a load shaft, a casing, a roller, a spindle extending through the roller and having its ends fixedly mounted in the casing; said roller having recessed ends, and self-alining anti-friction roller bearings mounted in the recessed ends of said roller and disposed between the latter and the spindle; said roller being elongated for an extended bearing engagement with the load shaft.

3. The combination of a casing having a pair of spaced supports, a load shaft, a roller located in the space between said supports, a spindle extending through the roller and having its ends fixedly mounted in said supports; said roller being free to turn on the spindle, and self-alining anti-friction roller bearings mounted on said spindle and disposed between the latter and the ends of said roller; the bearing surface of said roller extending over the anti-friction roller bearings so as to provide an extended bearing surface for engagement with the load shaft.

4. The combination of a casing having a pair of spaced supports, a spindle extending between said supports and having its ends fixedly mounted therein, a roller loosely mounted on the spindle and having a recess in each end, and two sets of self-alining anti-friction roller bearings; one set disposed in each of said recessed ends and arranged to travel in contact with said roller and the spindle.

5. The combination, in an anti-friction bearing, of a casing, a main roller, a spindle extending through the roller and having its ends fixedly mounted in the casing; said roller having recessed ends, and self-alining anti-friction roller bearings disposed in said recessed ends between said main roller and the spindle; said main roller having a bearing surface extending over the anti-friction roller bearings and providing an extended surface to support a load-carrying shaft.

6. The combination of a load shaft having a trunnion, a casing into which said trunnion extends having two side bearings or supports, a roller intermediate said supports and in bearing engagement with said trunnion, a spindle extending from one support to the other and through the roller, and self-alining anti-friction roller bearings located between the spindle and roller at each end of the latter.

7. The combination, in an anti-friction bearing, of a casing, a spindle fixedly supported at both ends in the casing, a load shaft, a roller loosely mounted on said spindle and bearing against the load shaft, and a series of self-alining anti-friction roller bearings located between the roller and the spindle; said roller overhanging and inclosing said roller bearings.

8. The combination, in a bearing for carrying extreme loads, of a load shaft having a trunnion, a casing having an opening for passage of the trunnion, a series of rollers located in said casing and bearing against said trunnion, spindles extending entirely through said rollers and having their ends fixedly mounted in the casing, and self-alining anti-friction roller bearings located between the ends of said rollers and their spindles; said rollers being elongated to provide an extended bearing surface for the trunnion and overhanging the anti-friction roller bearings.

In witness whereof I affix my signature.

JOSEPH W. THROPP.